(12) United States Patent
Cheng et al.

(10) Patent No.: US 10,698,785 B2
(45) Date of Patent: Jun. 30, 2020

(54) TASK MANAGEMENT BASED ON AN ACCESS WORKLOAD

(71) Applicant: International Business Machines Corporation, Armonk, NY (US)

(72) Inventors: Ping Ping Cheng, Beijing (CN); Jun Hua Gao, Beijing (CN); Guan Jun Liu, Beijing (CN); Xue Yong Zhang, Beijing (CN); Xi Bo Zhu, Beijing (CN); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/607,777

(22) Filed: May 30, 2017

(65) Prior Publication Data

US 2018/0349245 A1  Dec. 6, 2018

(51) Int. Cl.
*G06F 11/34* (2006.01)
*G06F 9/48* (2006.01)
*G06F 9/38* (2018.01)
*G06F 9/50* (2006.01)

(52) U.S. Cl.
CPC ........ *G06F 11/3404* (2013.01); *G06F 9/3855* (2013.01); *G06F 9/4881* (2013.01); *G06F 9/5083* (2013.01); *G06F 9/5094* (2013.01); *G06F 11/3433* (2013.01)

(58) Field of Classification Search
None
See application file for complete search history.

(56) References Cited

U.S. PATENT DOCUMENTS

| | | | |
|---|---|---|---|
| 6,681,241 B1 | 1/2004 | Fagen | |
| 8,918,793 B2 | 12/2014 | Balko | |
| 2004/0139142 A1 | 7/2004 | Arwe | |
| 2004/0243737 A1* | 12/2004 | Beardsley | G06F 13/385 710/22 |
| 2005/0097556 A1* | 5/2005 | Code | G06F 9/4881 718/102 |
| 2008/0288949 A1* | 11/2008 | Bohra | G06F 9/4881 718/104 |
| 2018/0046389 A1* | 2/2018 | Park | G06F 3/0619 |
| 2018/0181582 A1* | 6/2018 | Keymolen | G06F 16/1767 |

FOREIGN PATENT DOCUMENTS

| | | |
|---|---|---|
| EP | 2 731 008 A1 | 5/2014 |
| JP | 2001344119 A | 12/2001 |

OTHER PUBLICATIONS

Zhuravlev et al. "Addressing Shared Resource Contention in Multicore Processors via Scheduling". ASPLOS'10, Mar. 13-17, 2010, Pittsburgh, Pennsylvania.

(Continued)

*Primary Examiner* — Eric C Wai
(74) *Attorney, Agent, or Firm* — Edward P. Li (57) ABSTRACT

A computer-implemented method, a computer program product, and a computer system for parallel task management. A computer system receives a new task that requests to access a resource may be received. In response to an access workload being above a first threshold, the computer system dispatches the new task to at least one predefined processing unit, wherein the access workload may be associated with the resource that is in parallel accessed by a plurality of existing tasks.

21 Claims, 8 Drawing Sheets

(56) References Cited

OTHER PUBLICATIONS

Mell et al. "The NIST Definition of Cloud Computing". Recommendations of the NIST. NIST Special Publication 800-145. Gaithersburg, MD. Sep. 2011. pp. 7.
Appendix P List of IBM Patents Treated as Related. Dated Oct. 31, 2017. Two pages.
Cheng et al. Original U.S. Appl. No. 15/798,596, filed Oct. 31, 2017.

* cited by examiner

TASK MANAGEMENT BASED ON AN ACCESS WORKLOAD

BACKGROUND

The present invention relates generally to task management, and more particularly to methods, systems and computer program products for managing parallel tasks.

Modern computer systems are getting increasingly large and complex, such that these systems often contain hundreds of resources and support parallel access by a large number of users. As the number of access requests to a resource from the users grows, there is an ever-expanding workload for scheduling the parallel accesses in the computer system. If the computer system continuously receives from users a huge amount of data access requests to the resource, then the workload might be increased further and the response speed of the computer system could no longer satisfy users' requirements.

SUMMARY

In one aspect, a computer-implemented method for parallel task management is disclosed. According to the method, a new task that requests to access a resource may be received. The new task may be dispatched to at least one predefined processing unit, in response to an access workload being above a first threshold, wherein the access workload may be associated with the resource that is in parallel accessed by a plurality of existing tasks.

In another aspect, a computer system for parallel task management is disclosed. The computer system comprises one or more processors, one or more computer readable tangible storage devices, and program instructions stored on at least one of the one or more computer readable tangible storage devices for execution by at least one of the one or more processors. The program instructions are executable to receive a new task that requests to access a resource. The program instructions are executable to dispatch the new task to at least one predefined processing unit, in response to an access workload being above a first threshold, wherein the access workload is associated with the resource that is accessed in parallel by a plurality of existing tasks.

In yet another aspect, a computer program product for parallel task management is disclosed. The computer program product comprises a computer readable storage medium having program code embodied therewith. The program code is executable to: receive a new task that requests to access a resource; dispatch the new task to at least one predefined processing unit, in response to an access workload being above a first threshold, wherein the access workload is associated with the resource that is accessed in parallel by a plurality of existing tasks.

It is to be understood that the summary is not intended to identify key or essential features of implementations of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some implementations of the present invention in the accompanying drawings, the above and other objects, features and advantages of the present invention will become more apparent.

Throughout the drawings, same or similar reference numerals represent the same or similar elements.

DETAILED DESCRIPTION

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein.

It is understood in advance that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 1:
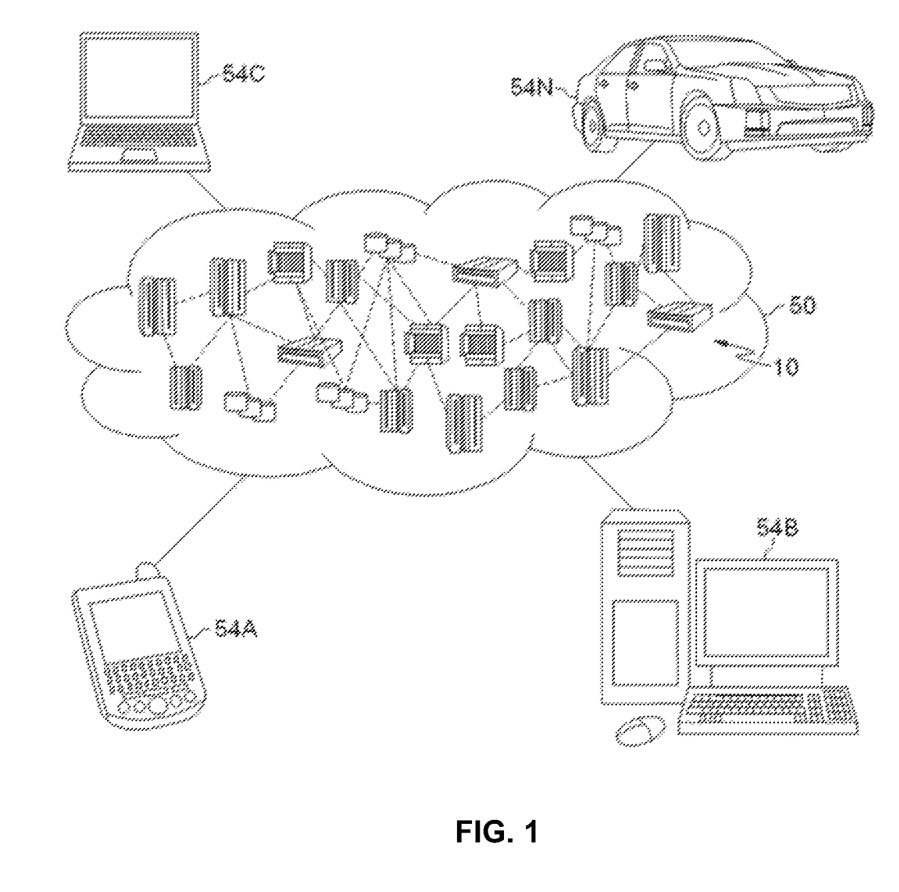
FIG. 1 schematically illustrates a cloud computing environment, in accordance with one embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
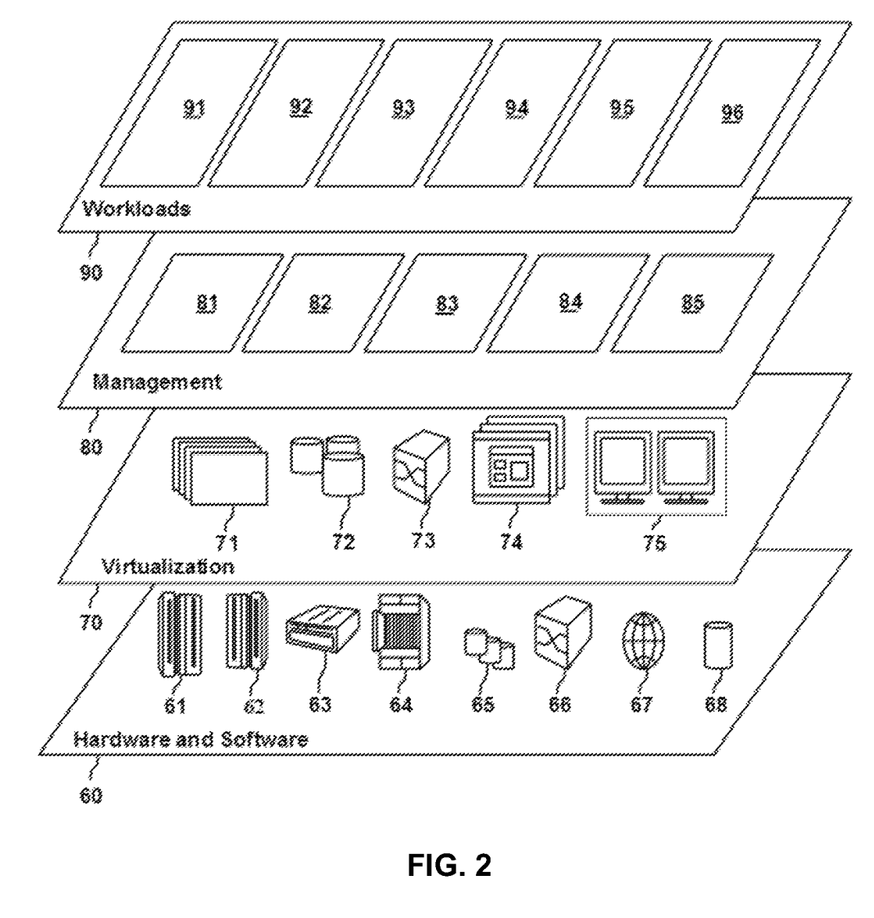
FIG. 2 schematically illustrates abstraction model layers, in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task processing 96 for implementing the parallel task management.

A cloud computing environment is service oriented with a focus on statelessness, low coupling, modularity, and semantic interoperability. At the heart of cloud computing is an infrastructure comprising a network of interconnected nodes.

Figure 3:
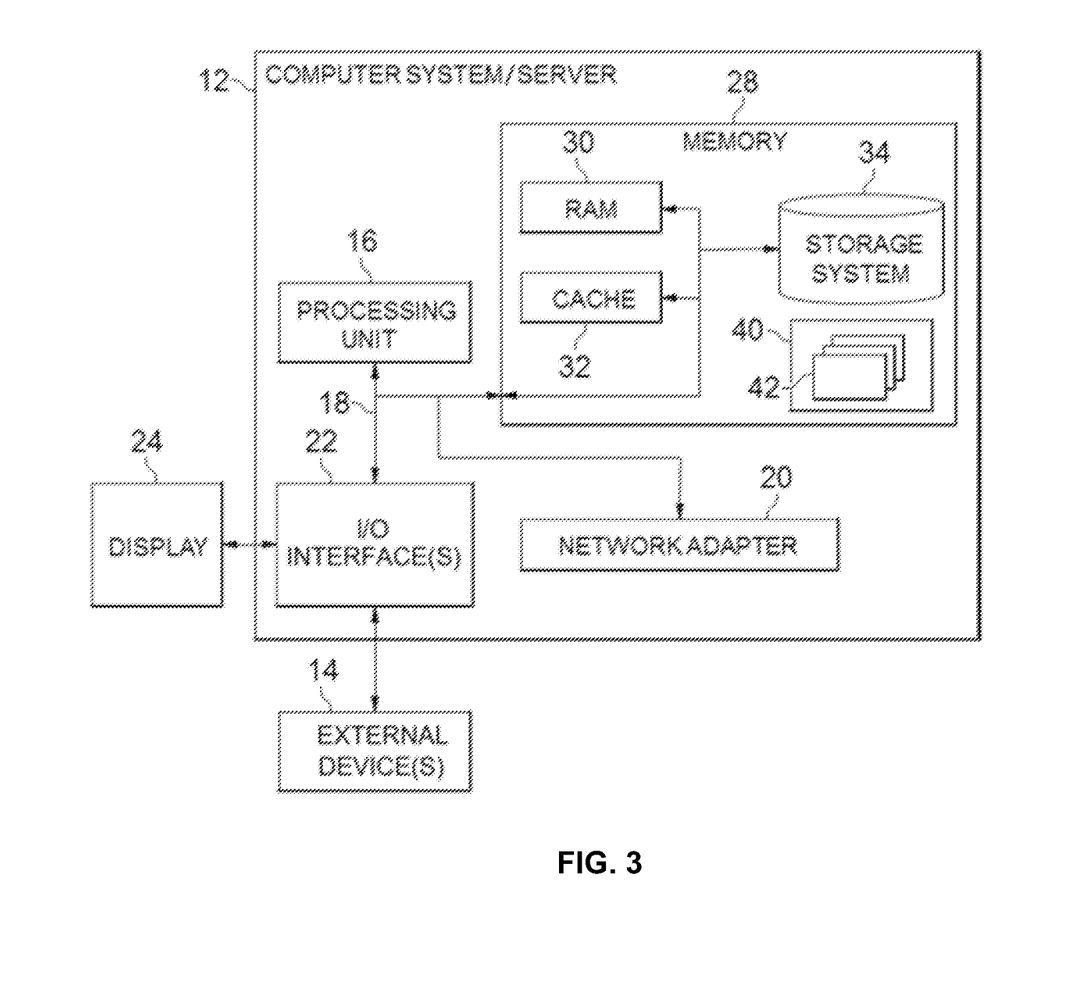
FIG. 3 schematically illustrates a cloud computing node, in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which can also be adapted to depict an illustrative example of a portable electronic device such as a communication device being applicable to implement the embodiments of the present invention, which is operational with numerous other general purpose or special purpose computer system environments or configurations. Examples of well-known computer systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, system memory 28, and bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

For the purpose of description, detailed description will be presented to various implementations of the present invention in a computer system, where a resource in the computer system may be shared among a plurality of tasks. It is to be understood that the computer system is just an example environment for illustration and not for limitation purpose. The disclosed method may also be applied to another type of environment, as long as there is a need to manage a plurality of tasks that request a same resource. In the context of the present invention, the shared resource may be for example, a file, a table, or another type of resource that may be shared among a plurality of tasks.

Figure 4:
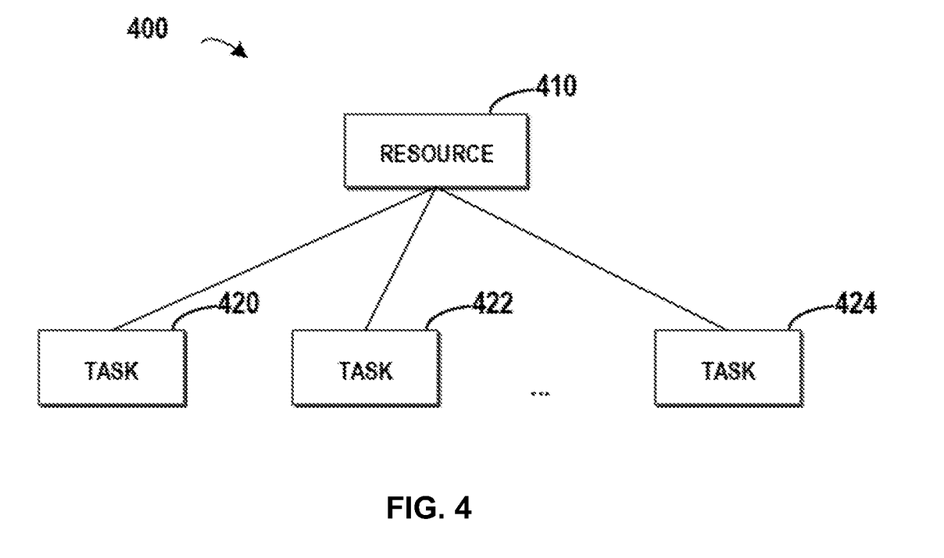
FIG. 4 schematically illustrates an example diagram of accessing a resource by a plurality of tasks, in accordance with one embodiment of the present invention.

If a plurality of tasks from users want to access a resource (such as a file in the computer system), then an individual task may be initiated by each of the users. FIG. 4 schematically illustrates example diagram 400 of accessing a resource by a plurality of tasks, in accordance with one embodiment of the present invention. As illustrated in FIG. 4, reference number 410 represents a resource that may be in parallel accessed. Tasks 420, 422, . . . , and 424 in parallel access resource 410. In some embodiments, a parallel access policy is provided in the computer system to prevent the access conflict. One parallel access policy is normal access mode in which tasks 420, 422, . . . , and 424 can be equally or randomly dispatched to all processing units so as to balance the workload of all the processing units. With the parallel access policy, the access control method such as a locking mechanism may be adopted for resource 410 in response to parallel accesses by tasks 420, 422, . . . , and 424. However, if the number of the tasks significantly grows, there may be tens of or even more tasks try to access the resource in parallel. On one hand, computing and storage resources of the computer system may be exhausted and heavy workloads are spent in scheduling these parallel accesses. On the other hand, tasks 420, 422, . . . , and 424 have to wait for a long time and sometimes a dead lock or another exception may occur in the computer system. Accordingly, the existing method cannot work efficiently when there are too much parallel accesses in the computer system.

In some solutions, more powerful devices may be deployed in the computer system to provide better performance. However, although these powerful devices may process a few more tasks, it might be possible that there may be much more parallel tasks being input and waiting for accessing the resource. Then, it may be a difficult question to manage the parallel tasks being persistently input in a more effective way.

In order to at least partially solve the above and other potential problems, a new method and system for parallel task management are disclosed herein. According to implementations of the present invention, a computer-implemented method is disclosed. In the method, a new task that requests to access a resource is received. The new task is dispatched to at least one predefined processing unit, in response to an access workload being above a first threshold, where the access workload may be associated with the resource that is in parallel accessed by a plurality of existing tasks. In this implementation, the first threshold may indicate a heavy workload.

Figure 5:
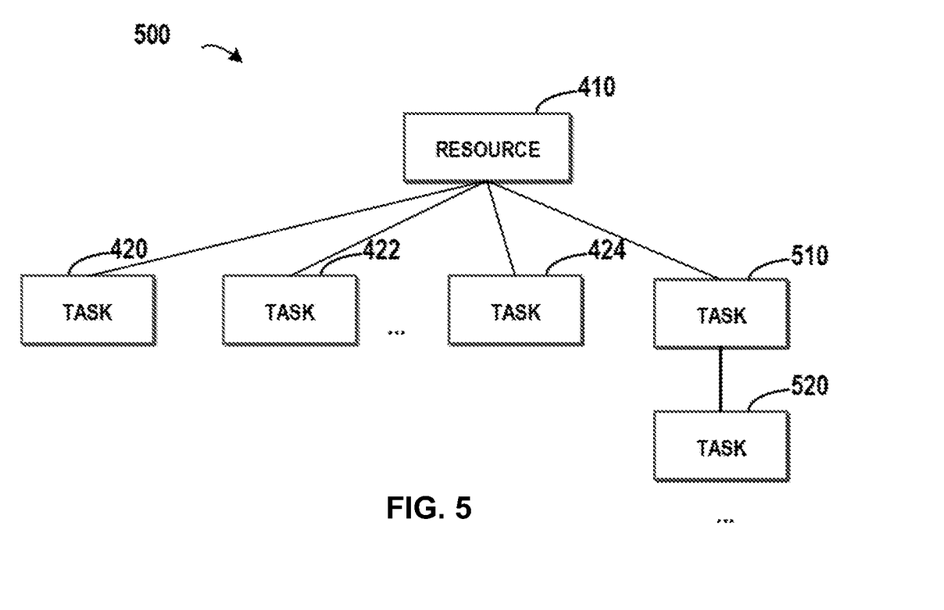
FIG. 5 schematically illustrates an example diagram of accessing a resource by a plurality of new tasks and a plurality of existing tasks, in accordance with one embodiment of the present invention.

FIG. 5 schematically illustrates example diagram 500 of accessing a resource by a plurality of new tasks and a plurality of existing tasks, in accordance with one embodiment of the present invention. Referring to FIG. 5, a great number of existing tasks such as tasks 420, 422, . . . , 424 may access resource 410 and the access workload for resource 410 may be heavy. Further, there are subsequent incoming tasks (such as tasks 510, 520, and so on) that are trying to access resource 410. In some embodiments, the incoming tasks may be dispatched to at least one predefined processing unit. For example, the incoming tasks may be dispatched by a dispatching module which is similar to a throttle in the computer system, such that the computing and storage resource of the computer system will not be exhausted. By dispatching these incoming tasks to the at least one predefined processing unit, tasks 420, 422, . . . , 424 may access resource 410 according to the predefined parallel access policy, and then the access workload for resource 410 may fall down to a normal range after some of tasks 420, 422, . . . , 424 have accessed resource 410.

Compared with the method that upgrades the computer system by using more powerful devices, the implementations of the present invention may provide a degrading mode, which may degrade the computer system by reducing the parallel accesses in the computer system. In the degrading mode, the accesses of the incoming tasks to the resource can be restricted, which leads to reduction of the parallel accesses to the resource. Accordingly, the long waiting time of the existing tasks caused by the heavy parallel accesses may be reduced and then the speed of the existing tasks for accessing resource 410 may be increased. Competition and deadlock related to resource 410 in the computer system may also be alleviated, which in turn accelerates the speed of the existing tasks for accessing resource 410.

Figure 6:
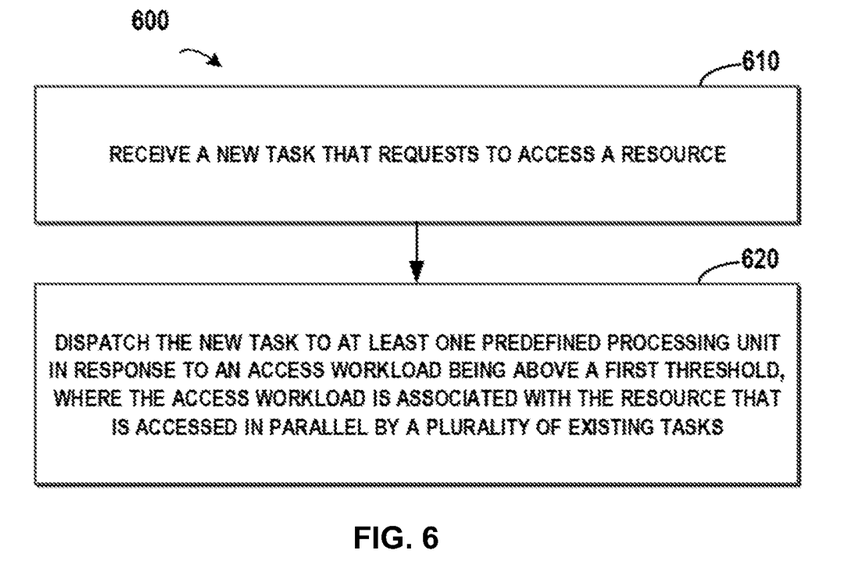
FIG. 6 schematically illustrates a flowchart of a method for accessing a resource by a plurality of tasks, in accordance with one embodiment of the present invention.

FIG. 6 schematically illustrates a flowchart of method 600 of accessing a resource by a plurality of tasks, in accordance with one implementation of the present invention. Referring to FIG. 6, at step 610, a computer system receives a new task that requests to access a resource. At step 620, the computer system dispatches the new task to at least one predefined processing unit in the computer system, in response to an access workload being above a first threshold, wherein the access workload is associated with the resource that is in parallel accessed by a plurality of existing tasks.

The new task may be any of incoming tasks 510, 520, and so on as illustrated in FIG. 5, and the existing tasks may be any of parallel tasks 420, 422, . . . , 424 as illustrated in FIG. 5. The heavy workload may indicate that the computing and storage resources of the computer system is nearly exhausted in scheduling parallel tasks 420, 422, . . . , and 424, and the response time of the computer system increases to a higher level. In order to prevent the subsequent incoming tasks further increase the response time, the computer system may dispatch these incoming tasks to at least one predefined processing unit so as to reduce the pressure on resource 410. In some implementations, the at least one predefined processing is different from the processing units hosting parallel tasks 420, 422, . . . , and 424. In some other implementations, the at least one predefined processing is one or more processing units from the processing units hosting parallel tasks 420, 422, . . . , and 424.

In the present invention, the access workload indicates a cost for accessing resource 410, and it may be measured according to various aspects related to accessing resource 410. For example, the access workload may be determined based on a waiting time which indicates how long a previous task has spent in waiting for the access. In another example, the access workload may be determined based on the number of the existing parallel tasks.

Although the new task may be dispatched to the at least one predefined processing unit in FIG. 6, if there are multiple new tasks, in some implementations, all the multiple new tasks can be dispatched to one predefined processing units. In some other embodiments, the multiple new tasks may be dispatched to a restricted number of processing units. Then, there may be one or more task in a specific predefined processing unit, and the specific predefined processing unit may execute the new task(s). In one implementation, after a portion of existing parallel tasks 420, 422, . . . , and 424 have accessed resource 410 and the access workload have dropped down, the computer system may return to the normal access mode, and the incoming tasks may be processed as usual.

In some implementations of the present invention, in response to a plurality of new tasks being dispatched to the at least one predefined processing unit, the plurality of new tasks may be served by the at least one predefined processing unit serially. Details of the implementations will be described with reference to FIG. 7, which schematically illustrates example diagram 700 of accessing a resource by a plurality of new tasks serially, in accordance with one embodiment of the present invention.

Figure 7:
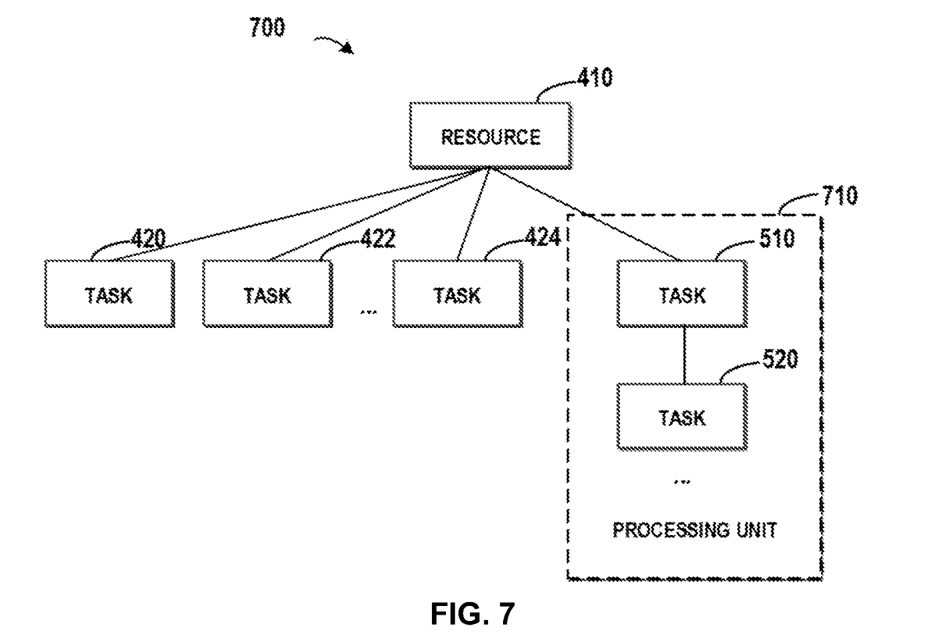
FIG. 7 schematically illustrates an example diagram of accessing a resource by a plurality of new tasks serially, in accordance with one embodiment of the present invention.

It is to be understood that although only one processing unit 710 is illustrated in FIG. 7, tasks 510, 520 and so on may be dispatched to one or more processing unit. In one implementation, a dispatching rule may be predefined for describing a mapping between the new tasks and the processing units. For example, the dispatching rule may define that the number of the processing units depends on the access workload. If the access workload is already extremely heavy, then only one processing unit may be allocated to serve incoming tasks 510, 520, and so on. Alternatively, if the access workload is nearly extremely heavy, then more than one processing unit may be allocated to serve incoming tasks 510, 520, and so on. In another example, the dispatching rule may define that the number of the processing units depends on the number of the incoming tasks, and one processing unit may serve a certain number of the incoming tasks. For example, if the dispatching rule defines that one processing unit may serve 10 tasks and 20 incoming tasks are received, then the 20 incoming tasks may be dispatched to 2 processing units.

Referring to FIG. 7, in some implementations of the present invention, the plurality of new tasks may be queued in a queue, and then the plurality of new tasks in the queue may access resource 410 serially, e.g., access resource 410 one by one. In FIG. 7, tasks 510, 520, and so on may be queued in a queue at processing unit 710. Initially, task 510 may access resource 410 in parallel with tasks 420, 422, . . . , and 424. At this point, task 510, 420, 422, . . . , and 424 may follow the predefined parallel access policy and wait for the access. After task 510 has accessed resource 410, task 510 may be removed from the queue. Accordingly, task 520 becomes the first task in the queue and may access resource 410 in parallel with other tasks 420, 422, . . . , and 424 if they have not accessed resource 410. In other implementations, all the plurality of new tasks in the restricted number of processing units may be queued in a queue.

In some implementations of the present invention, a further new task that requests to access the resource may be received as the computer system runs. At this point, if the access workload still indicates a heavy workload, the further new task may be queued in the queue. With these implementations, when the access workload is heavy, the parallel accesses to the resource may continuously be reduced by dispatching the further new task to the at least one predefined processing unit. In other words, the subsequent incoming task may be queued and wait in the queue for its turn to access resource 410.

In some implementations of the present invention, the resource may be accessed by the plurality of tasks in parallel. Referring to FIG. 7 again, tasks 420, 422, . . . , and 424 may access resource 410 according to the parallel access policy. Once one of the tasks is finished, the finished task may quit the parallel accesses such that the access workload may decrease. Gradually, with more and more tasks having accessed resource 410, the workload of parallel accesses in the computer system may cool down, and the speed for accessing resource 410 may be increased.

In some implementations of the present invention, the access workload may be measured in the computer system according to various manners. In one implementation, the access workload may be measured by a monitoring module. For example, the waiting time may be considered as the access workload, where the waiting time indicates how long a previous task waits before accessing the resource. In some implementations, the history of previous tasks may be logged in the computer system, and the history may record: the time point at which the previous task is received, and the time point at which the previous task accesses resource 410. Based on the history, the waiting time may be determined and then be considered as the access workload. In one example, if the waiting time is 0.5 ms which is larger than the first threshold 0.3 ms, then the parallel accesses to the resource may be reduced by dispatching the incoming new task to the at least one predefined processing unit. In another example, a second threshold (for example, 0.2 ms) may be predefined to indicate a light workload. If the waiting time is 0.15 ms which is lower than the second threshold, the computer system may use the normal mode during processing the tasks, e.g., all new incoming tasks can be equally or randomly dispatched to all processing units.

In some implementations, the number of the tasks that are accessing resource 410 may be considered as the access workload. It is clear that the more tasks access resource 410 in parallel, the heavier the access workload is. Thus, the number of the tasks may be another indicator of the access workload. In a similar manner, the first and second thresholds may be determined with based on the number of the tasks.

In some implementations of the present invention, if the access workload falls down to a normal range, the operation of the computer system may use the normal access mode. Specifically, an access workload associated with the resource may be monitored; and in response to the access workload being below a second threshold, the normal parallel access to the resource may be used for the new task. In this implementation, the second threshold may indicate a light workload.

Figure 8A:
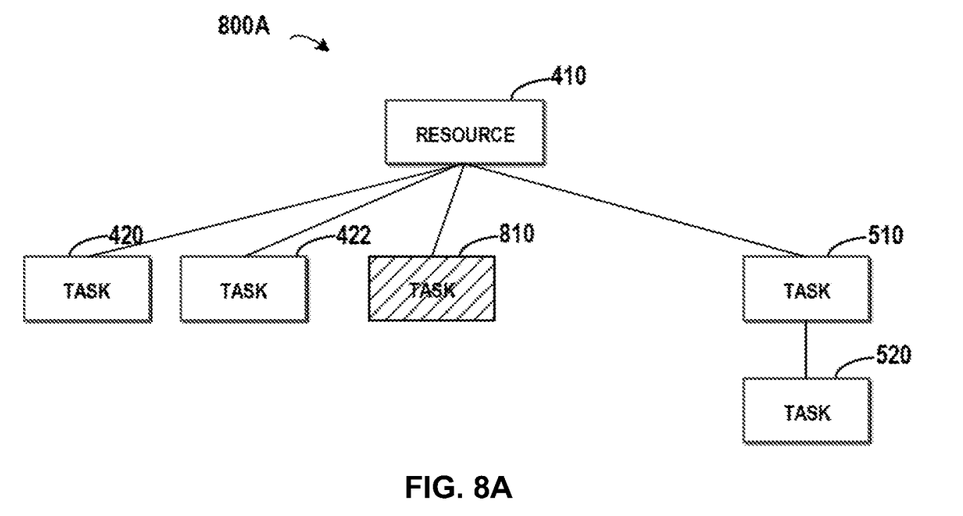
FIG. 8A, FIG. 8B, and FIG. 8C schematically illustrate example diagrams of accessing a resource by a plurality of tasks, in accordance with another embodiment of the present invention.
Figure 8B:
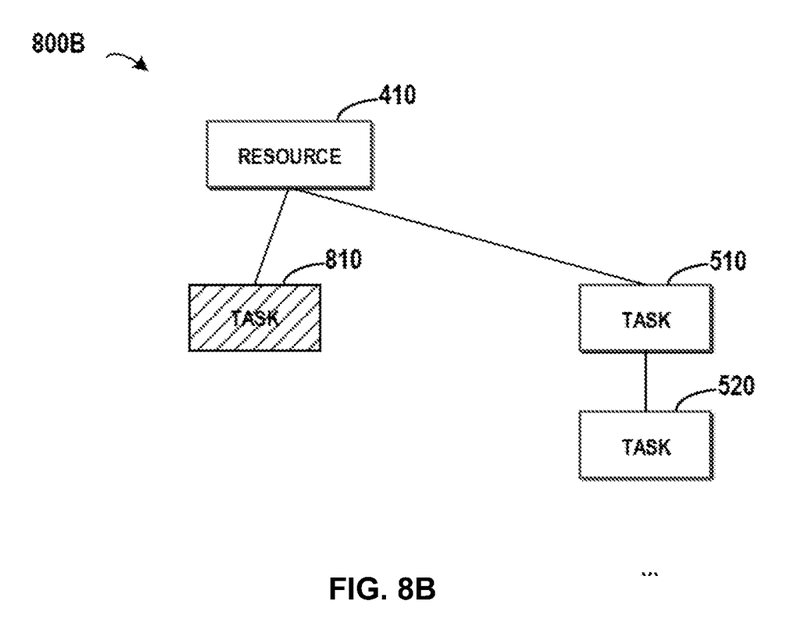
Figure 8C:
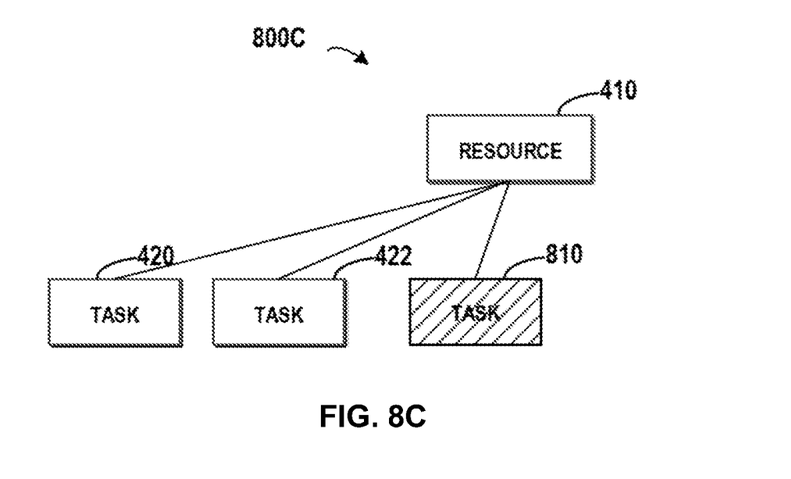

In some implementations of the present invention, a further new task that requests to access the resource may be received and then the resource may be accessed by the further new task. If all the existing tasks have accessed resource 410, the further new task may access resource 410 exclusively. Otherwise, the new task may access resource 410 in parallel with other tasks. Reference will be made to FIG. 8A, FIG. 8B and FIG. 8C to describe details.

FIG. 8A schematically illustrates example diagram 800A for accessing a resource by a plurality of tasks, in accordance with another embodiment of the present invention. As the time goes after the situation of FIG. 7, a portion of the plurality of tasks 420, 422, . . . , and 424 in FIG. 7 may finish accessing resource 410 and the access workload may drop. For example, task 424 in FIG. 7 ends and there are only parallel tasks 420 and 422 may access resource 410 and thus the access workload are relative low. Subsequently, new task 810 (indicated by the shadow block) is received. As the access workload for resource 410 is relative low at this point, the computer system may use a normal mode when processing new task 810. Accordingly, new task 810 may access resource 410 in parallel with tasks 420 and 422 as well as queued tasks 510, 520, and so on. In another implementation, at least one of tasks 510, 520, and so on may be migrated to another processing unit originally hosting tasks 420 and 422 so as to increase the performance.

It is to be understood that although tasks 510, 520 and so on are included in the queue of FIG. 8A, the queue may include other number of tasks. For example, if task 810 has accessed resource 410, task 810 may be removed from the queue. Further, although FIG. 8A illustrates a situation where only one new task 810 may be received, a plurality of tasks may be received and then the plurality of tasks may access resource 410 in parallel as long as the access workload for resource 410 is below the predefined first threshold.

FIG. 8B schematically illustrates example diagram 800B for accessing a resource by a plurality of tasks, in accordance with another embodiment of the present invention. As shown in FIG. 8B, if all of parallel tasks 420, 422, . . . , and 424 in FIG. 7 have accessed resource 410, and tasks 510 and 520 are still waiting, then new task 810 may access resource 410 in parallel with tasks 510 and 520.

FIG. 8C schematically illustrates example diagram 800C for accessing a resource by a plurality of tasks, in accordance with another embodiment of the present invention. As shown in FIG. 8C, if tasks 510 and 520 in FIG. 7 have accessed resource 410, and tasks 420 and 422 are still waiting, then new task 810 may access resource 410 in parallel with tasks 420 and 422, i.e., task 810, tasks 420, and 422 are in a side by side fashion.

With the disclosed implementations, when the access workload for the resource is heavy, the computer system may enter into the degrading mode, where the parallel accesses to the resource may be reduced by dispatching the new tasks to the at least one predefined processing unit that are received subsequently. Further, if the access workload drops down to a normal range, the computer system may use the normal mode. The two modes may provide a resource balance for the computer system through both parallel and serial accesses to the resource, and prevent the situation that all the computing and storage resources in the computer system are exhausted by the parallel accesses.

In some implementations of the present invention, an access workload associated with a resource is monitored by a monitoring module in the computer system. Here, the resource is in parallel accessed by a plurality of tasks. In response to the access workload being above a first threshold, at least one task that requests to access the resource may be determined. Further, parallel accesses to the resource may be reduced by dispatching the at least one task to at least one predefined processing unit.

Figure 9:
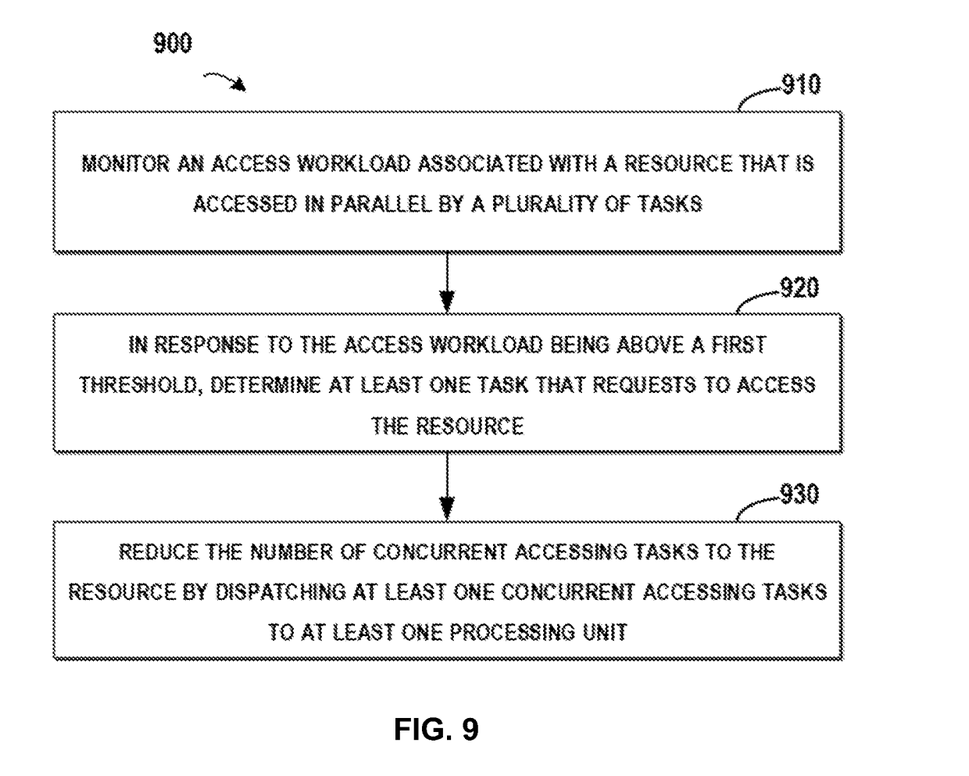
FIG. 9 schematically illustrates a flowchart of a method for accessing a resource by a plurality of tasks, in accordance with yet another implementation of the present invention.

FIG. 9 schematically illustrates a flowchart of method 900 for accessing a resource by a plurality of tasks, in accordance with yet another embodiment of the present invention. At step 910, a computer system monitors an access workload associated with resource 410, where resource 410 is in parallel accessed by a plurality of tasks. In the present invention, the access workload indicates a cost for accessing resource 410, and it may be measured according to various aspects related to accessing resource 410. For example, the access workload may be determined based on a waiting time which indicates how long a previous task has spent in waiting for the accessing. In another example, the access workload may be determined based on the number of the parallel tasks.

At step 920, in response to the access workload being above a first threshold, the computer system determines at least one task that requests to access the resource. The heavy workload may indicate that the computing and storage resources of the computer system is exhausted in scheduling parallel tasks 420, 422, . . . , and 424, and the response speed of the computer system drops to a low level. Here, the at least one task may refer to subsequent incoming tasks 510, 520 and so on in FIG. 5. In order to prevent the subsequent incoming tasks further lower the response speed, these incoming tasks may be dispatched to at least one processing unit so as to reduce the pressure of the computer system.

At step 930, the computer system reduces the number of parallel accessing tasks to the resource by dispatching at least one parallel accessing tasks to at least one processing unit such that the available capacities in the computer system may focus on processing existing parallel tasks 420, 422, . . . , and 424.

The at least one task may be processed according to various ways. For example, the at least one tasks may be delayed and wait for the parallel accesses to resource 410 to cool down. In another example, the at least one task may be dispatched to a restricted number of processing units. At this point, these processing units may execute the at least one task. As the number is restricted, executing the at least one task will not add too much workload to the computer system. In one implementation, after a portion of existing parallel tasks 420, 422, . . . , and 424 finishes accessing resource 410 and then the access workload drops, the computer system may return to a normal mode, and the incoming tasks may be processed as usual.

Figure 10:
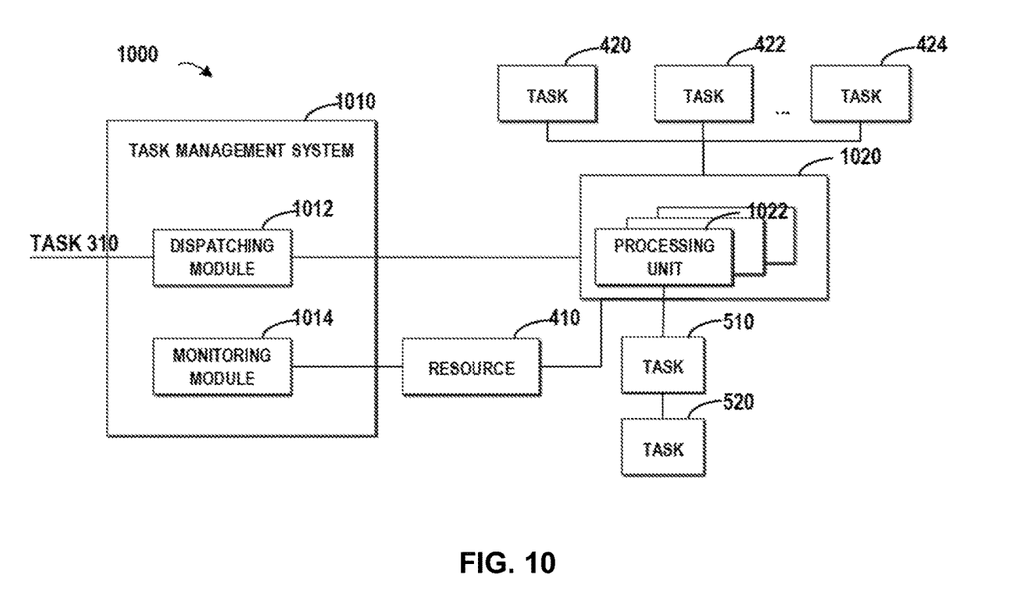
FIG. 10 schematically illustrates an example diagram of managing a plurality of tasks by a task management system, in accordance with one embodiment of the present invention.

FIG. 10 schematically illustrates example diagram 1000 for managing a plurality of tasks by task management system 1010, in accordance with one embodiment of the present invention. As illustrated in FIG. 10, task management system 1010 is provided for managing tasks, and it may include dispatching module 1012. Dispatching module 1012 dispatches the new tasks to at least one predefined processing unit 1022, in response to an access workload being above a first threshold. Task management system 1010 may further include monitoring module 1014 for monitoring the access workload associated with resource 410.

According to FIG. 10, existing tasks 420, 422, . . . , and 424 have been dispatched to one processing unit in processing unit group 1020 in the normal mode, and these tasks are in parallel accessing resource 410 through the processing unit which they have been dispatched. Monitoring module 1014 may monitor the access workload associated with resource 410. If the access workload is determined to be heavy by monitoring module 1014, dispatching module 1012, which have dispatched new tasks 510 and 520 to processing unit 1022, may dispatch new tasks 310 to processing unit 1022. Although FIG. 10 illustrates a situation of three tasks are dispatched to processing unit 1022, in another situation, more or less tasks may be dispatched to processing unit 1022. Further, in another implementation, there may be more than one predefined processing units and each of these predefined processing units may accept one or more new tasks that are dispatched by dispatching module 1012.

Although resource 410 and processing unit 1022 are not illustrated inside task management system 1010 of FIG. 10, in another implementation, resource 410 and processing unit 1022 may be located within task management system 1010. Alternatively, resource 410 and processing unit 1022 may be located within task management system 1010 and the other may be located outside task management system 1010.

According to one implementation of the present invention, a computer-implemented method is disclosed. According to the method, a new task that requests to access a resource may be received. The new task may be dispatched to at least one predefined processing unit, in response to an access workload being above a first threshold, where the access workload is associated with the resource that is in parallel accessed by a plurality of existing tasks.

According to one implementation of the present invention, a computer system is disclosed. The computer system comprises a computer processor coupled to a computer-readable memory unit, where the memory unit comprises instructions that when executed by the computer processor implements a method. According to the method, a new task that requests to access a resource may be received. The new task may be dispatched to at least one predefined processing unit in response to an access workload being above a first threshold, where the access workload is associated with the resource that is in parallel accessed by a plurality of existing tasks.

According to one implementation of the present disclosure, a computer program product is disclosed. The computer program product comprising a computer readable storage medium having program instructions embodied therewith, the program instructions executable by a electronic device to cause the electronic device to: receive a new task that requests to access a resource; dispatch the new task to at least one predefined processing unit in response to an access workload being above a first threshold, wherein the access workload is associated with the resource that is in parallel accessed by a plurality of existing tasks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for task management based on an access workload, comprising:
    monitoring, by a task management system in a computer system, an access workload of a resource in the computer system, wherein the resource is being accessed by existing tasks in a parallel access mode;
    determining, by the task management system, whether the access workload is above a first threshold, wherein the first threshold indicates a heavy access workload;
    determining, by the task management system, whether the access workload is below a second threshold, wherein the second threshold indicates a light access workload;
    receiving, by the task management system, one or more new tasks that request to access the resource;
    dispatching, by the task management system, the one or more new tasks to at least one processing unit in the computer system, in response to determining that the access workload is above the first threshold, wherein the existing tasks continue to access the resource in the parallel access mode while the at least one processing unit allows the one or more new tasks to access the resource sequentially;
    queuing, by the task management system, the one or more new tasks in a serial queue for accessing the resource, wherein a first task in the serial queue accesses the resource in parallel with the existing tasks while tasks other than the first task in the serial queue access the resource sequentially;
    determining whether the access workload is extremely heavy;
    in response to determining that the access workload is extremely heavy, allocating only one processing unit to serve the one or more new tasks; and
    in response to determining that the access workload is not extremely heavy, allocating more than one processing unit to serve the one or more new tasks.

2. The computer-implemented method of claim 1, further comprising:
    in response to a task in the serial queue having accessed the resource, removing, by the at least one processing unit, the task from the serial queue.

3. The computer-implemented method of claim 1, further comprising:
    in response to determining that the access workload is below the second threshold, dispatching, by the task management system, the one or more new tasks in the parallel access mode; and
    wherein the one or more new tasks access the resources in parallel with the existing tasks.

4. The computer-implemented method of claim 1, wherein the monitoring the access workload comprises monitoring a waiting time, wherein the waiting time is how long a previous task waits before accessing the resource.

5. The computer-implemented method of claim 1, wherein the monitoring the access workload comprises monitoring how many of the existing tasks are in the parallel access mode.

6. The computer-implemented method of claim 1, wherein the task management system in the computer system comprises a monitoring module and a dispatching module, wherein the monitoring module monitors the access workload of the resource in the computer system, wherein the dispatching module dispatches the one or more new tasks to the at least one processing unit in the computer system.

7. The computer-implemented method of claim 1, further comprising:
    dispatching, by the task management system, the one or more of the existing tasks to the at least one processing unit in the computer system, in response to determining that the access workload is above the first threshold.

8. A computer system for parallel task management based on an access workload, the computer system comprising:
    one or more processors, one or more computer readable tangible storage devices, and program instructions stored on at least one of the one or more computer readable tangible storage devices for execution by at least one of the one or more processors, the program instructions executable to:
    monitor, by a task management system in a computer system, an access workload of a resource in the computer system, wherein the resource is being accessed by existing tasks in a parallel access mode;
    determine, by the task management system, whether the access workload is above a first threshold, wherein the first threshold indicates a heavy access workload;
    determine, by the task management system, whether the access workload is below a second threshold, wherein the second threshold indicates a light access workload;
    receive, by the task management system, one or more new tasks that request to access the resource;
    dispatch, by the task management system, the one or more new tasks to at least one processing unit in the computer system, in response to the access workload being above the first threshold, wherein the existing tasks continue to access the resource in the parallel access mode while the at least one processing unit allows the one or more new tasks to access the resource sequentially;
    queue, by the task management system, the one or more new tasks in a serial queue for accessing the resource, wherein a first task in the serial queue accesses the resource in parallel with the existing tasks while tasks other than the first task in the serial queue access the resource sequentially;

determine whether the access workload is extremely heavy;

in response to determining that the access workload is extremely heavy, allocate only one processing unit to serve the one or more new tasks; and in response to determining that the access workload is not extremely heavy, allocate more than one processing unit to serve the one or more new tasks.

9. The computer system of claim 8, further comprising the program instructions executable to:

in response to a task in the serial queue having accessed the resource, remove, by the at least one processing unit, the task from the serial queue.

10. The computer system of claim 8, further comprising the program instructions executable to:

in response to the access workload associated with the resource being below the second threshold, dispatch, by the task management system, the one or more new tasks in the parallel access mode; and wherein the one or more new tasks access the resource in parallel with the existing tasks.

11. The computer system of claim 8, wherein the monitoring the access workload comprises monitoring a waiting time, wherein the waiting time is how long a previous task waits before accessing the resource.

12. The computer system of claim 8, wherein the monitoring the access workload comprises monitoring how many of the existing tasks are in the parallel access mode.

13. The computer system of claim 8, wherein the task management system in the computer system comprises a monitoring module and a dispatching module, wherein the monitoring module monitors the access workload of the resource in the computer system, wherein the dispatching module dispatches the one or more new tasks to the at least one processing unit in the computer system.

14. The computer system of claim 8, further comprising the program instructions executable to:

dispatch, by the task management system, the one or more of the existing tasks to the at least one processing unit in the computer system, in response to determining that the access workload is above the first threshold.

15. A computer program product for parallel task management based on an access workload, the computer program product comprising a computer readable storage medium having program code embodied therewith, the program code executable to:

monitor, by a task management system in a computer system, an access workload of a resource in the computer system, wherein the resource is being accessed by existing tasks in a parallel access mode;

determine, by the task management system, whether the access workload is above a first threshold, wherein the first threshold indicates a heavy access workload;

determine, by the task management system, whether the access workload is below a second threshold, wherein the second threshold indicates a light access workload;

receive, by the task management system, one or more new tasks that request to access the resource;

dispatch, by the task management system, the one or more new tasks to at least one processing unit in the computer system, in response to the access workload being above the first threshold, wherein the existing tasks continue to access the resource in the parallel access mode while the at least one processing unit allows the one or more new tasks to access the resource sequentially;

queue, by the task management system, the one or more new tasks in a serial queue for accessing the resource, wherein a first task in the serial queue accesses the resource in parallel with the existing tasks while tasks other than the first task in the serial queue access the resource sequentially;

determine whether the access workload is extremely heavy;

in response to determining that the access workload is extremely heavy, allocate only one processing unit to serve the one or more new tasks; and in response to determining that the access workload is not extremely heavy, allocate more than one processing unit to serve the one or more new tasks.

16. The computer program product of claim 15, further comprising the program code executable to:

in response to a task in the serial queue having accessed the resource, remove, by the at least one processing unit, the task from the serial queue.

17. The computer program product of claim 15, further comprising the program code executable to:

in response to the access workload associated with the resource being below the second threshold, dispatch, by the task management system, the one or more new tasks in the parallel access mode; and wherein the one or more new tasks access the resource in parallel with the existing tasks.

18. The computer program product of claim 15, wherein the monitoring the access workload comprises monitoring a waiting time, wherein the waiting time is how long a previous task waits before accessing the resource.

19. The computer program product of claim 15, wherein the monitoring the access workload comprises monitoring how many of the existing tasks are in the parallel access mode.

20. The computer program product of claim 15, wherein the task management system in the computer system comprises a monitoring module and a dispatching module, wherein the monitoring module monitors the access workload of the resource in the computer system, wherein the dispatching module dispatches the one or more new tasks to the at least one processing unit in the computer system.

21. The computer program product of claim 15, further comprising the program code executable to:

dispatch, by the task management system, the one or more of the existing tasks to the at least one processing unit in the computer system, in response to determining that the access workload is above the first threshold.

* * * * *